July 8, 1969

L. A. PARSONS 3,454,066

ONION END CUTTER

Filed Nov. 7, 1966

INVENTOR
LESLIE A. PARSONS
BY Young & Thompson
ATTYS.

INVENTOR
LESLIE A. PARSONS
BY Young + Thompson
ATTYS.

United States Patent Office
3,454,066
Patented July 8, 1969

1

3,454,066
ONION END CUTTER
Leslie A. Parsons, Burry Port, Wales, assignor to
Leslie A. Parsons & Sons Limited
Filed Nov. 7, 1966, Ser. No. 592,435
Claims priority, application Great Britain, Nov. 26, 1965,
50,302/65, 50,304/65; July 4, 1966, 29,916/66
Int. Cl. A01d 23/04
U.S. Cl. 146—83
6 Claims

ABSTRACT OF THE DISCLOSURE

A cutting apparatus for topping and tailing onions and the like comprises an onion carrier movable to convey successive onions through a cutting position, and two sets of knife carriers resiliently mounted for movement toward and away from the cutting position. The knife carriers are also resiliently mounted for movement of the knives heightwise of the onions at the cutting position. The feelers on the knife carriers are engaged by the onions to effect both of these movements simultaneously.

---

This invention relates to cutting apparatus which can be used to top and tail root and fruit crops and is more especially intended for onions.

For convenience of description the term "onion" used herein is intended to include other similar articles of root and fruit crops.

The object of the invention is to provide cutting apparatus which will effectively cut off the tops and tails of an assortment of onions or other crops of different shapes and sizes.

According to the present invention there is provided a cutting apparatus for topping and tailing articles such as onions, comprising an article carrier movable to convey successive articles through a cutting position, two sets of knife carrier devices resiliently mounted for adjusting movement towards and from the cutting position and resiliently mounted for adjusting movement of the knives heightwise of the article at the cutting position, and feeler means carried by said devices for engagement by the articles whereby the said adjusting movements are effected.

In practice the apparatus for topping and tailing onions comprises an onion carrier having a plurality of pairs of onion carrying notches, two sets of knife carrier devices made according to the invention, one arranged each side of the onion carrying notches and a means for moving said notches successively between said knife carrier devices whereby as each onion is conveyed to the knife carrier devices, the shoulders of the onion enter between the guide blocks of the feelers and push the slide bars together with the respective knives and feelers apart to an extent determined by the size of each shoulder, i.e. by the distance between the pairs of guide blocks, thereafter the onion is topped and tailed by the knives.

The invention will now be described, by way of example, with reference to the accompanying drawings, wherein:

FIGURE 4 is an elevation of the knife blade and feelers as viewed along the line 4—4 of FIGURE 3.

Figure 1:
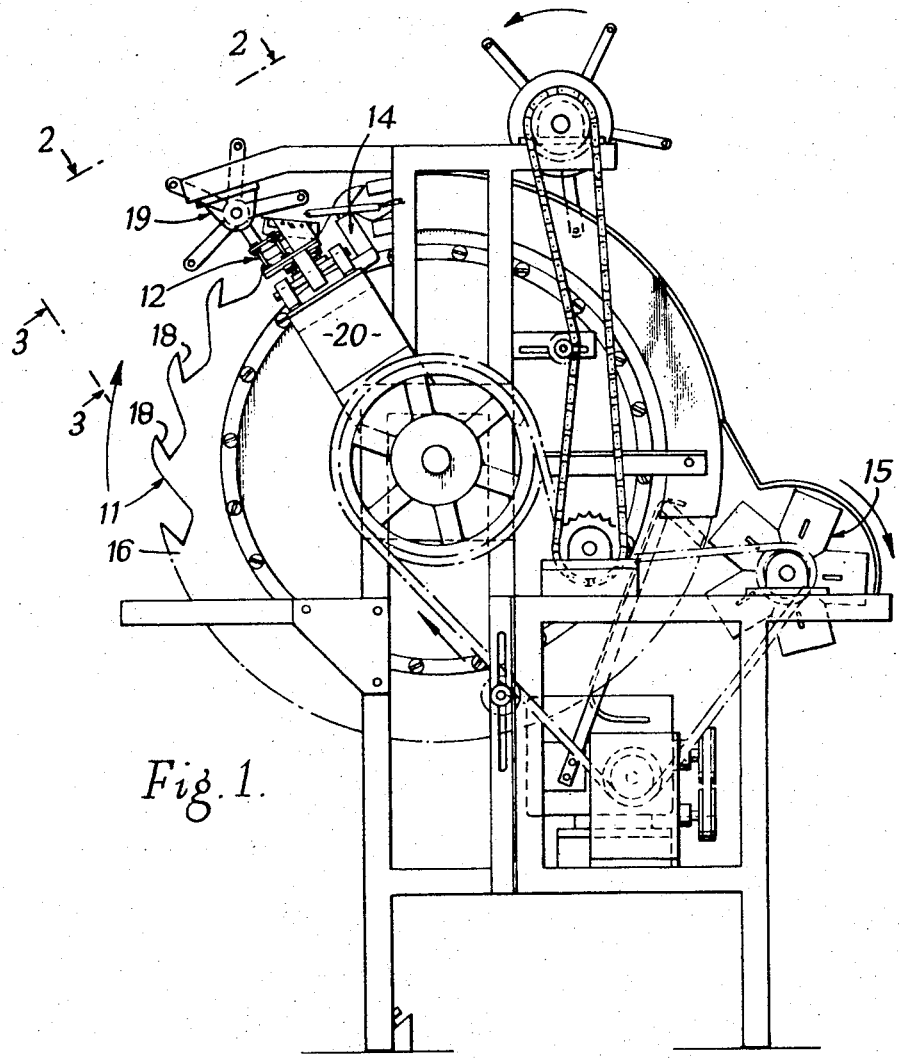
FIGURE 1 is a side elevation of a cutting apparatus made in accordance with the invention.
Figure 2:
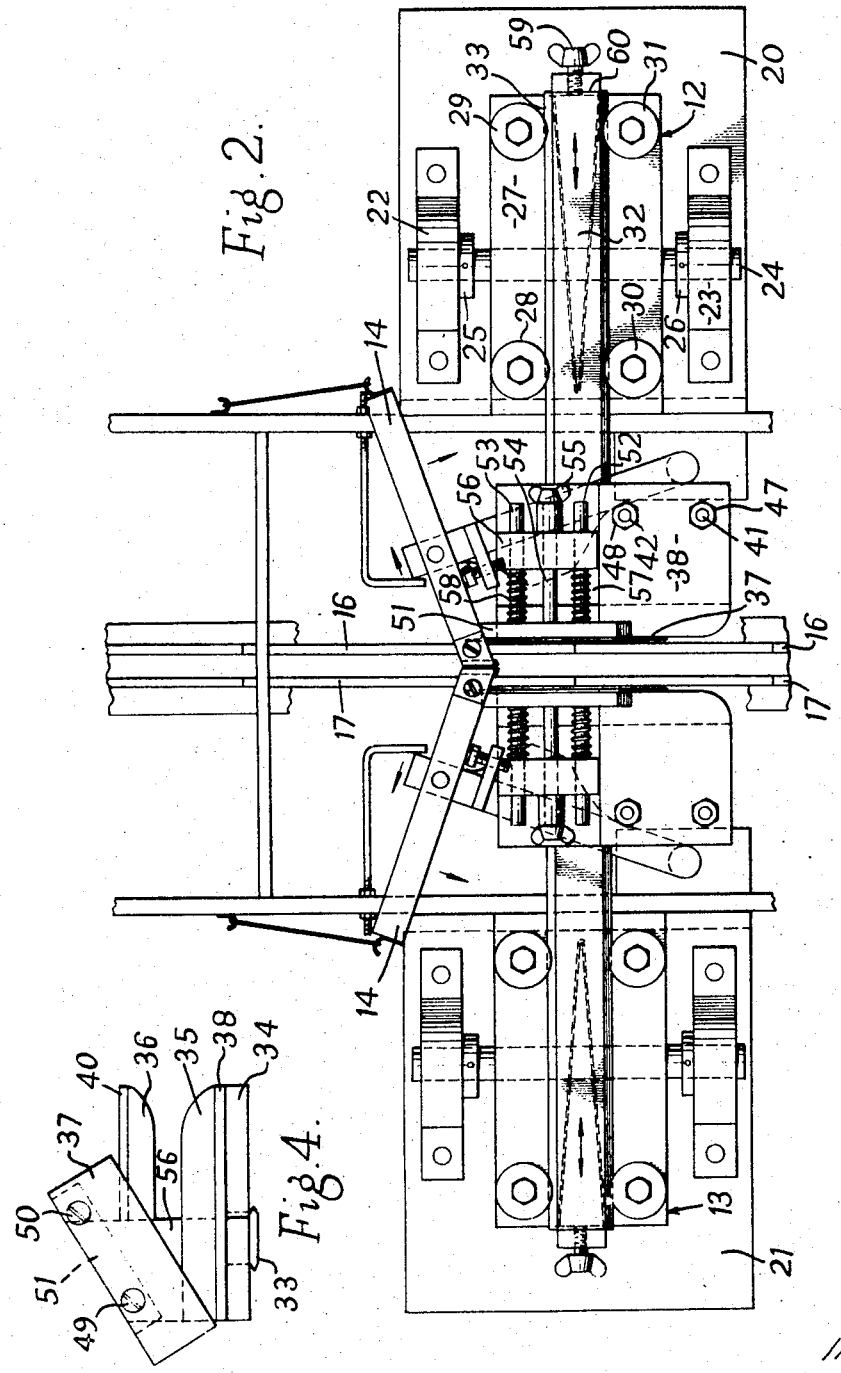
FIGURE 2 is a plan view of the cutting apparatus as viewed along the line 2—2 in FIGURE 1.
Figure 3:
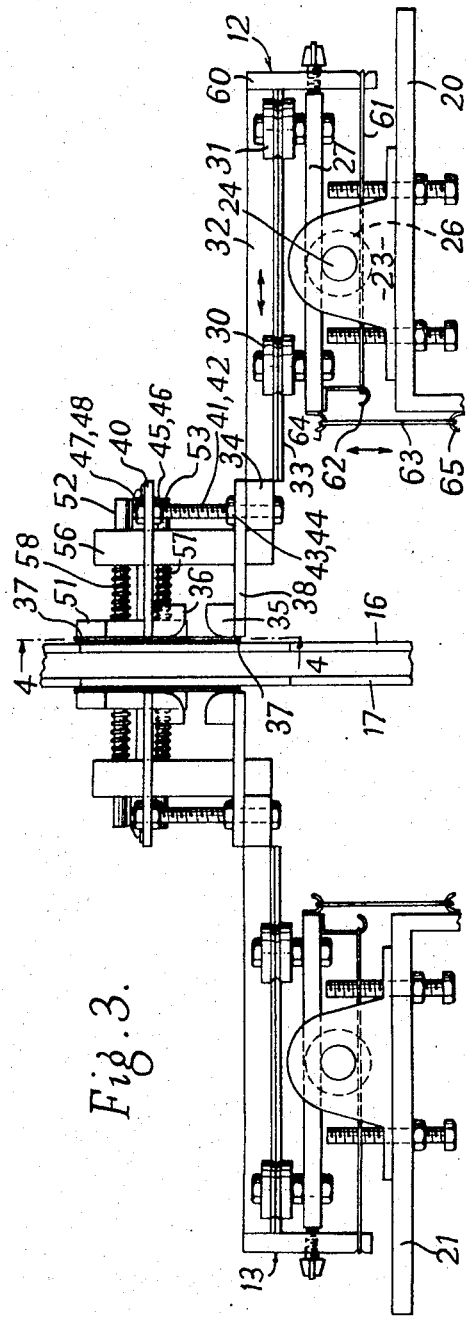
FIGURE 3 is an end view of part of the apparatus as viewed along the line 3—3 in FIGURE 1.

Referring to the drawings, the apparatus comprises an article carrier 11, two knife carrier devices 12, 13 arranged on either side of the article carrier 11, a knife

2 mechanism 14 for slitting the skins of the onion substantially from top to tail (described and claimed in the specification of copending application No. 593,046) and an air blast means 15 for separating onion skins from the edible part of the onion.

The article carrier 11 is formed by two approximately circular plates or discs 16, 17 which are fixed together parallel to each other but spaced apart e.g. by a circular spacer member, by about one quarter to one half inch. These plates 16, 17 are mounted to form a wheel-like member for rotation on a horizontal axle and are driven by an electric motor and variable speed gearing or other suitable means. The periphery of each plate is cut out at regular intervals to form onion carrying notches 18. These notches 18 are shaped so that the apices of all the notches fall on a common circle (pitch circle). Each notch 18 presents a V-shape viewed axially of the disc and the tangent to the pitch circle at the apex of the notch bisects the notch so that the edges of the notch lie on opposite sides of the line of travel represented by the pitch cricle, one edge being nearer to the axis of the wheel-like member than the other. The result of this is that the onions irrespective of size have their axes substantially on but transversely across the pitch circle. The direction of rotation of the article carrier 11 is such that the wide open ends of the notches 18 precede their apices.

Attached to the frame of the machine, and arranged on either side of the article carrier 11, are two L-shaped brackets 20, 21 extending radially from the axis of the article carrier at a position which in side view is at an angle of, for example, 30° to the perpendicular passing through said axis. Each bracket 20, 21 comprises an upright member and a laterally extending member at right angles to each other. The plane of the laterally extending member is at an angle of, for example, 30° to the horizontal as viewed in FIGURE 1.

The knife carrier devices 12, 13 which are identical to each other, are carried on the laterally extending members of the brackets 20, 21. For convenience of description the knife carrier device 12 will be described in detail but it is to be understood that the description applies equally to the knife carrier device 13.

The knife carrier device 12 comprises two bearing blocks 22, 23 secured to the laterally extending member of the bracket 20. A spindle 24 is located in the bearings 25, 26 of the blocks 22, 23 so as to be able to rock about its axis. The bearings 25, 26 are provided with grub screws which bear on the spindle 24 which serve to prevent any axial movement of said spindle. A rectangular plate 27 is secured, e.g. by welding, tangentially to the spindle 24. Four pairs of rollers 28, 29, 30 and 31 are secured, e.g. by bolt and nut, to the plate 27 so as to be able to rotate reciprocally about a mean position. The adjacent peripheral edges of each roller are chamfered so that when each roller is assembled, an annular groove of V-shape cross-section is formed. A slide-bar 32 formed of a metal or plastics material of rectangular cross-section has a member 33 secured e.g. by screws to the underside thereof. The member 33 which is made of metal, has a rectangular profile with a length equal to that of the slide bar 32 and a width greater than that of the slide bar 32. The longitudinal edges of the member 33 are ground and hardened to form knife edges of V-shape, the angle of the apex of the knife edges corresponding to and engaging in the V-shaped annular groove of the rollers 28, 29, 30 and 31. In order to ensure that the member 33, when attached to the slide bar 32, is correctly carried by the rollers, i.e. to ensure that there is no free play between the knife edges and the annular grooves of the rollers, two of the rollers, 28, 29 or 30, 31 are eccentrically mounted so that the particular pair of rollers can be rotated about their axes until there is no free play between the knife edges and the annular grooves. The rollers are then fixed in the adjusted positions.

A bracket 34 in the form of a rectangular bar is secured e.g. by welding, at right angles to the end of the slide bar 32. A substantially rectangular plate 38, which is attached by bolts 41, 42 and nuts 43, 44 respectively to the bracket 34, is provided to support upper and lower guide blocks 35, 36. The lower guide block 35 is secured along the upper side of the free edge of the plate 38 and the upper guide block 36 is secured to the underside of a plate 40. The plate 40 and the guide block 36 are shorter in length than the plate 38 and the guide block 35 respectively. The plate 40 with guide block 36 is carried on the plate 38 by means of the bolts 41, 42 and nuts 45, 47 and 46, 48 respectively. The guide blocks 35, 36 are mounted parallel to each other so that they are arranged above and below a tangent to the pitch circle and constitute a feeler the entrant surfaces of which are chamfered in two directions to form a flared inlet between them so that the tops and tails of the onions run between the guide blocks. The relative distance between the guide blocks 35, 36 may be adjusted by turning the nuts 45, 47 on bolt 41 and the nuts 46, 48 on bolt 42 in the desired direction. A knife blade 37 is secured, for example, by screws 49, 50 to a rectangular block 51. The block 51, which may be made of metal or plastics has three studs 52, 53, 54 secured thereto and extending at right angles therefrom. The studs 52, 53 have plain shanks whereas the stud 54 is threaded along part of its length.

The knife blade 37 (see FIGURE 4) is mounted at an angle across the pitch circle, i.e. at an angle of, for example, 30° to the plane of the plate 38 which is parallel to a chord of the pitch circle, and is supported by an upright support member 56 secured at right angles to the bracket 34, for example, by welding. The free end of the support member 56 is cut at an angle corresponding to the angle at which the knife blade 37 is mounted with respect to the plate 38 for example, 30°. The support member 56 has three holes provided therein in positions corresponding to the studs 52, 53, 54 so that when the studs are inserted in said holes, the back or non-cutting edge of the knife blade 37 is in line with the free end of the member 56. The holes corresponding to studs 52, 53 are a sliding fit on the studs whereas the hole corresponding to stud 54 is a clearance hole.

In order to maintain the distance between the knife blade 37 and the support member 56 constant, compression springs 57, 58 are provided on studs 52, 53 respectively so that when the studs 52, 53, 54 are inserted in their respective holes in the support member 56, the springs 57, 58 when compressed urge the block 51 with the knife blade 37 away from the member 56. A nut 55 is provided on the threaded portion of the stud 54 which serves to limit the movement of the block 51 away from the support member 56 and also provides a means for adjusting the distance between the knife blade 37 and the feeler constituted by guide blocks 35, 36 thereby permitting a lesser or greater amount to be cut from the ends of the onions.

The position of the slide bar together with the guide blocks 35, 36 and the knife blade 37 may be bodily adjusted with respect to the onion carrier 11 by means of a screw 59. The screw 59 passes through a threaded hole, provided in an abutment member 60 which is secured, for example, by means of screws to the end of the slide bar 32, and bears against the edge of the plate 27. By turning the screw 59, for example, clockwise the slide bar 32 together with the guide blocks 35, 36 and the knife 37 are moved away from the onion carrier 11, whereas by turning the screw 59 in the opposite direction the slide bar 32 moves towards the onion carrier 11. The adjustment of the relative position of the knife blade 37 by nut 55 usually is effected by a corresponding adjustment to the relative position of the slide bar by screw 59 so that the distance between the knife blade 37 and the onion carrier 11 is substantially constant e.g. one sixteenth of an inch.

A resilient means 61 e.g. a tension spring or an elastic band is provided in order to urge the slide bar 32 towards the onion carrier 11. The resilient means 61 is connected between the abutment member 60 and an abutment 62 attached to the underside of plate 27.

The slide bar 32 is resiliently restrained by a resilient means 63, e.g. a tension spring or elastic band connected between an abutment 64 attached to the end of the plate 27 and an abutment 65 attached to the upright member of the bracket 20, against a stop (not shown) so that an off centre top or tail can displace the feeler and the knife blade up or down radially of the discs 16, 17, i.e. transversely across the notches.

The adjustment of the guide blocks 35, 36 from their opposed positions e.g. to allow for an increasing or decreasing gap to allow a top or tail to protrude more or less, and the adjustment of the knife allows for practically any desired cut to be affected.

The leading corners of the knife blades may be bent away from the plane of the knife blade to ensure a smooth entry of the discs 16, 17 between the knife blades or to allow for any misalignment.

In operation the onions are placed one in each pair of notches 18 with the axis of the onion (through the top and tail) disposed transversely of the line of motion of the carrier and laterally through the notches and the shoulders of the onion resting on the discs 16, 17 with the central part of the onion disposed between said discs. The onion carrier 11 carries the onion to the guide blocks or feelers of the knife assemblies. The ends of the onion extend between the two pairs of feeler blocks 35, 36 and the shoulders of the onion engage these blocks whereupon the blocks and knives 37 are pushed apart by the onion to the extent required on each side, and the blocks and knives are tilted independently about the shafts 24 according to the shapes of the ends of the onion. This rocking motion moves the knives heightwise of the onion at the cutting position, according to the off-centre shape of the end of the onion. The onion is then topped and tailed by the knives 37.

The feeler on one side moves independently of the feeler on the other side and to the same or to a greater or less degree according to the shape or length of the onion at the top or the tail, the knives being adjusted simultaneously on opposite sides.

For holding the onions firmly in the notches 18 as they are presented to the knife blades 27 there is provided a star wheel 19 on a horizontal axis adjacent the knife blades but on a radius greater than the pitch circle. The arms (e.g. five arms) of the star wheel successively enter between the discs 16, 17. The notches 18 push the onion against an arm and rotate the star wheel 19 which is restrained frictionally against free rotation so that the onion is pressed firmly into the notch.

I claim:
1. A cutting apparatus for topping and tailing onions, comprising an onion carrier movable to convey successive onions through a cutting position, two sets of knife carrier devices, means mounting said devices resiliently for movement toward and away from said cutting position, means mounting said devices resiliently for movement of the knives heightwise of the onions at said cutting position, and feeler means carried by said devices for engagement by the onions to effect both said movements simultaneously.

2. A cutting apparatus as claimed in claim 1 wherein said feeler means comprises a pair of guide blocks on each of said devices spaced apart and flared for engagement between them of the shoulders of the onions and allowing the ends of the onions to pass between them.

3. A cutting apparatus as claimed in claim 1 wherein each said device comprises a support member, two bearings secured to said support member, a plate supported in said bearings for rocking movement with respect to said support member, rollers mounted on said plate with the axes of the rollers at right angles to the plane of said plate, a slide bar supported by said rollers for reciprocal movement in a direction at right angles to a rocking axis of said plate, a knife blade and feeler means comprising two guide blocks mounted parallel to each other attached to one end of said slide bar, a stop on the other end of said slide bar, and resilient tensioning means connected between said stop and an abutment on said plate serving to urge the stop against one end of said plate.

4. A cutting apparatus as claimed in claim 3 wherein said stop has a tapped hole therein, and in the hole a screw which bears upon said one end of said plate and which adjusts the relative position of the slide bar and the knife blade and feeler means with respect to said plate.

5. A cutting apparatus as claimed in claim 4, and means for adjusting the position of the knife blade with respect to the feeler means.

6. A cutting apparatus as claimed in claim 3, and means resiliently urging the feeler means and the knife blade to a median position with respect to the support member.

References Cited

UNITED STATES PATENTS

| | | |
|---|---|---|
| 1,282,462 | 10/1918 | Ricks. |
| 1,290,049 | 1/1919 | Bass et al. |
| 2,494,914 | 1/1950 | Urschel et al. _____ 146—83 |

W. GRAYDON ABERCROMBIE, *Primary Examiner.*